United States Patent
Colombo et al.

(10) Patent No.: US 9,815,440 B2
(45) Date of Patent: Nov. 14, 2017

(54) ACTUATING DEVICE WITH COLLAPSIBLE LEVER

(75) Inventors: Marcello Colombo, Milan (IT); Roberto Lavezzi, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 633 days.

(21) Appl. No.: 13/141,819

(22) PCT Filed: Dec. 24, 2008

(86) PCT No.: PCT/IT2008/000795
§ 371 (c)(1),
(2), (4) Date: Jul. 19, 2011

(87) PCT Pub. No.: WO2010/073276
PCT Pub. Date: Jul. 1, 2010

(65) Prior Publication Data
US 2011/0271789 A1 Nov. 10, 2011

(51) Int. Cl.
*B60T 7/10* (2006.01)
*B62L 3/02* (2006.01)

(52) U.S. Cl.
CPC ............. *B60T 7/102* (2013.01); *B62L 3/023* (2013.01); *Y10T 74/206* (2015.01)

(58) Field of Classification Search
CPC ..... B60T 7/08; B60T 7/02; B60T 7/10; B60T 7/102; B62K 23/06; B62K 23/04; B62K 23/00; B62K 11/14; B62K 11/16; B62L 3/02; B62L 3/00; B62L 3/023; G05G 1/04; G05G 1/08; G05G 1/082; G05G 1/085; B62M 25/04; Y10T 74/2042; Y10T 74/20402; Y10T 74/20396; Y10T 74/206

USPC ............. 74/523–526, 547, 488, 489, 473.14, 74/473.15, 502.2, 551.8, 501.6, 500.5, 74/543; 188/344, 24.11, 24.22, 196 F, 188/196 BA, 152; 60/594, 584, 586
See application file for complete search history.

(56) References Cited

U.S. PATENT DOCUMENTS

| | | | | |
|---|---|---|---|---|
| 4,635,442 A | * | 1/1987 | Bass | 60/594 |
| 4,779,482 A | | 10/1988 | Kawaguchi | |
| 6,003,639 A | * | 12/1999 | Buckley et al. | 188/344 |
| 6,457,378 B2 | * | 10/2002 | Hatakoshi et al. | 74/489 |
| 6,739,133 B2 | * | 5/2004 | Barnett | 60/594 |

(Continued)

FOREIGN PATENT DOCUMENTS

| | | |
|---|---|---|
| DE | 20018705 | 12/2000 |
| DE | 102005014065 | 9/2006 |

(Continued)

OTHER PUBLICATIONS

Description DE102005014065. European Patent Office: Espacenet Patent Search. http://translationportal.epo.org/emtp/translate/?ACTION=description-retrieval&COUNTRY=DE&ENGINE=google&FORMAT=docdb&KIND=A1&LOCALE=en_EP&NUMBER=102005014065&OPS=ops.epo.org&SRCLANG=de&TRGLANG=en.*

*Primary Examiner* — Daniel D Yabut
(74) *Attorney, Agent, or Firm* — Davis & Bujold PLLC; Michael J. Bujold

(57) ABSTRACT

A brake or clutch actuating lever is rotatably connected to a support structure. An adjustment lever, mechanically distinct from the actuating lever, transmits the angular actuation stroke of the actuating lever to a brake or clutch actuation unit. The adjustment lever comprises a mechanism for adjusting the rest position of the adjustment lever, mechanically separate from the actuating lever.

14 Claims, 4 Drawing Sheets

(56) References Cited

U.S. PATENT DOCUMENTS

| | | | |
|---|---|---|---|
| 6,804,961 B2 * | 10/2004 | Lumpkin | 74/502.2 |
| 7,204,088 B2 * | 4/2007 | Uchiyama et al. | 60/594 |
| 8,408,090 B2 * | 4/2013 | Weiher | 74/525 |
| 2001/0022114 A1 * | 9/2001 | Brainard | 74/525 |
| 2003/0101722 A1 * | 6/2003 | Barnett | 60/533 |
| 2003/0183038 A1 * | 10/2003 | Cornolti | B60T 7/10 74/525 |
| 2005/0160870 A1 * | 7/2005 | Barnett | 74/523 |
| 2006/0070483 A1 * | 4/2006 | Dimsey | 74/525 |
| 2006/0185465 A1 | 8/2006 | Leuschke et al. | |
| 2007/0283692 A1 * | 12/2007 | Tetsuka | B60T 7/102 60/594 |
| 2007/0283774 A1 * | 12/2007 | Lavezzi et al. | 74/40 |
| 2008/0044253 A1 * | 2/2008 | Esposito et al. | 74/519 |

FOREIGN PATENT DOCUMENTS

| | | |
|---|---|---|
| DE | 4408741 C5 * | 8/2010 |
| EP | 0173513 | 3/1986 |
| JP | 60199755 | 10/1985 |
| JP | 2001260972 | 9/2001 |
| WO | WO 2005049416 A1 * | 6/2005 |
| WO | 2006/070417 | 7/2006 |
| WO | 2006/070419 | 7/2006 |

* cited by examiner

ACTUATING DEVICE WITH COLLAPSIBLE LEVER

FIELD OF THE INVENTION

This invention regards an actuating device with collapsible lever for vehicles, in particular for motorcycles.

BACKGROUND OF THE INVENTION

It is well known that a motorcycle brake and clutch are activated manually by an actuating device in the form of a lever on the handlebars from which a hydraulic tube extends to the system in question, for example a hydraulically actuated brake or clutch.

The device actuating lever is usually located on the handlebar grips and the motorcyclist grasps the handlebars and lever and draws the latter towards the handgrip. Movement of the lever in turn produces a thrust on a hydraulic piston whose stroke or position determines the pressure of the fluid in the abovementioned hydraulic tube to command the associated brake or clutch.

Since these levers are normally the most external and exposed parts of a motorcycle, in the case of a fall the free end of the lever may strike the ground with a greater or lesser violent impact, causing breakage or deformation of the lever, or of its support and its fixing structure on the handlebars.

Breakage of the lever renders a manual brake or clutch unusable and is therefore serious damage that prevents the motorcyclist from continuing a journey or a race, for example.

The state of the art comprises collapsible levers which in the case of impact or fall permit an opening or shifting movement of the lever away from the handlebars in such a way as to reduce the risk of breakage.

These devices however do not always succeed in avoiding such breakage or deformation of the lever as to render it unusable.

SUMMARY OF THE INVENTION

The aim of this invention is to create an actuating device that resolves the above drawbacks with reference to the state of the art.

These drawbacks are resolved by an actuating device in accordance with claim 1.

Other forms of implementation of the actuating device in accordance with the invention are described in the subsequent claims.

BRIEF DESCRIPTION OF THE DRAWINGS

Further features and advantages of this invention will be more easily understood from the description that follows of favoured though not limitative examples of implementation in which.

Figure 1:
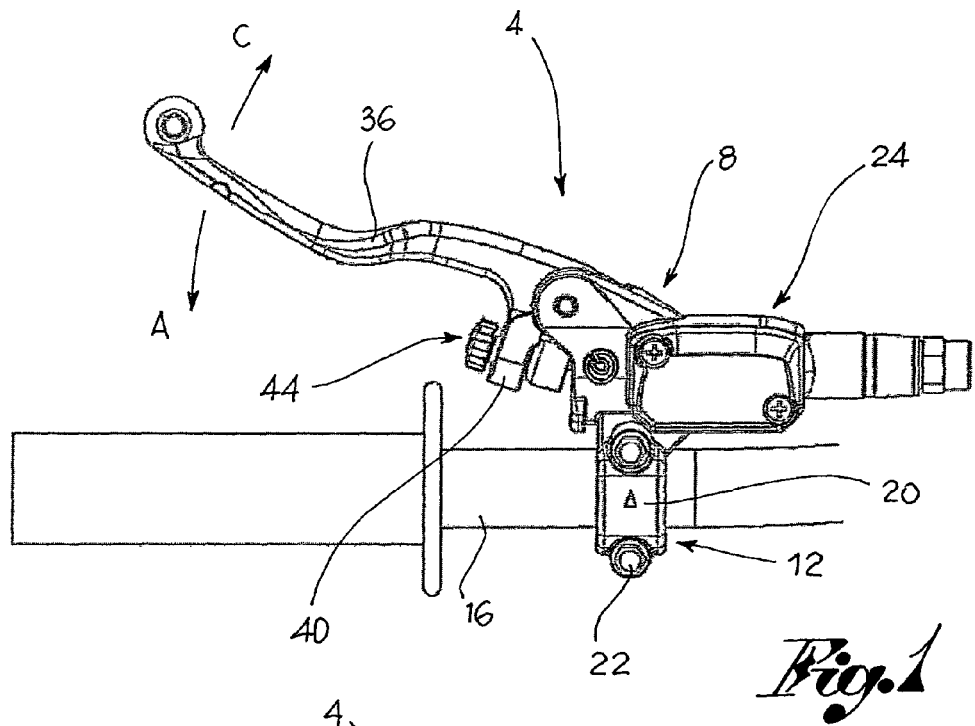
FIG. 1 shows in rest position an actuating device, in accordance with one form of implementation of this invention.
Figure 3:
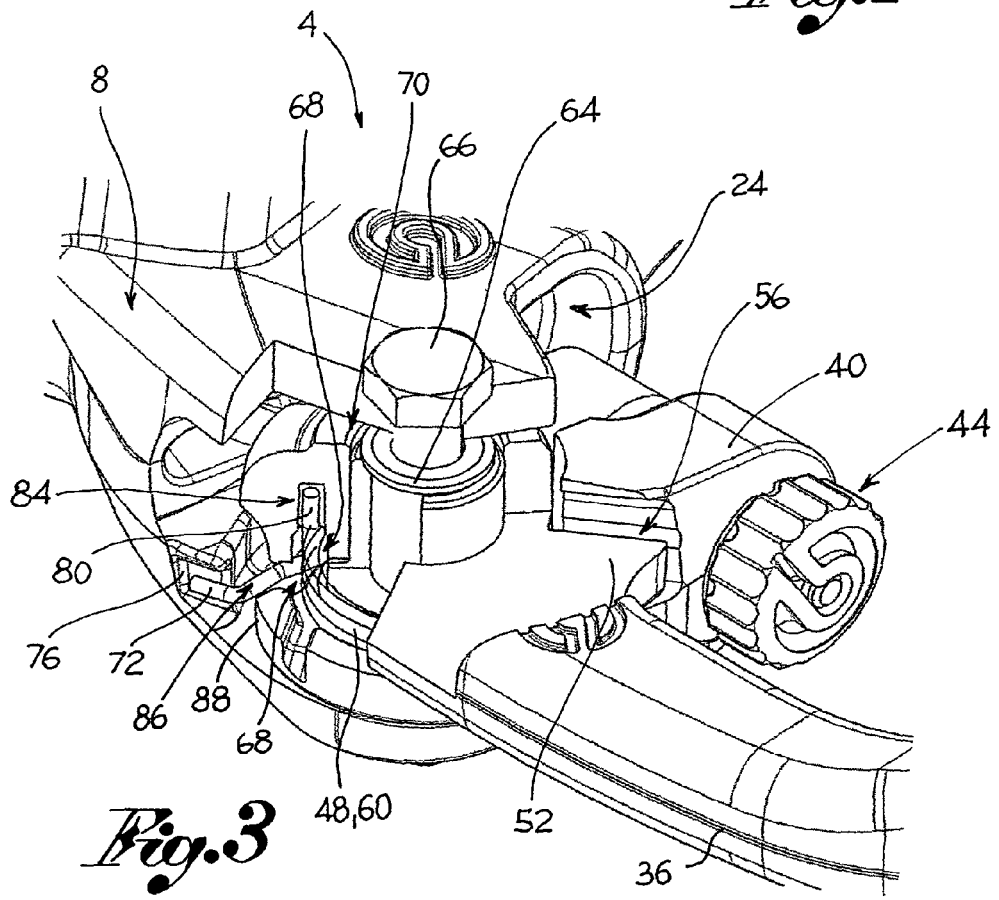
FIGS. 3 and 4 represent views partially in section of the device in FIG. 1.
Figure 2:
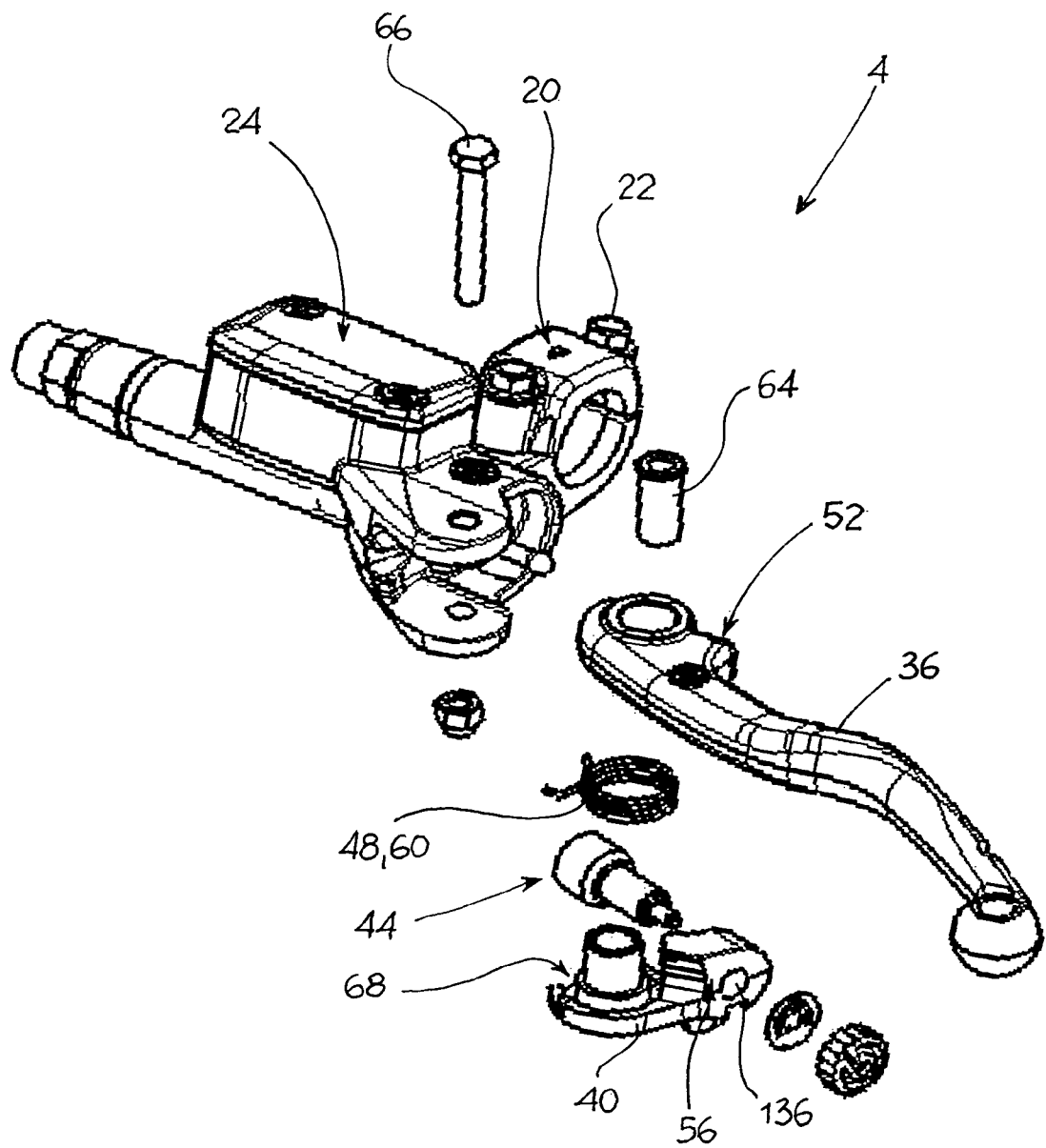
FIG. 2 shows a perspective view in separate parts of the device in FIG. 1.

With reference to the above figures, 4 generically indicates a lever actuating device for vehicles.

DETAILED DESCRIPTION OF THE INVENTION

Lever actuating device 4 comprises a support structure 8 with means 12 for connecting the device 4 to vehicle handlebars 16.

For example, the means 12 for connective device 4 to handlebars 16 comprises one or more locking portions with appropriate threaded holes for locking screws 22.

Device 4 comprises an actuating unit 24 linked to support structure 8.

In accordance with one form of implementation, actuating unit 24 comprises a cylinder-piston unit manufactured separately from support structure 8 and subsequently connected, or it may comprise a cylindrical housing 28, created directly in support structure 8, which houses a sliding piston 32.

In accordance with a further form of implementation, actuating unit 24 comprises an actuating cable operationally linked to a vehicle brake or clutch.

Device 4 comprises an actuating lever 36 rotatably connected to support structure 8 along an angular stroke of actuation (A) which extends from an angular rest position (R) of actuating lever 36, in a first sense of rotation towards the handlebars 16, and along an angular stroke of collapse (C) which extends from the said angular rest position (R) in a second sense of rotation opposite to the first.

Device 4 comprises an adjustment lever 40 mechanically distinct from actuating lever 36 and rotatably connected to support structure 8 in such a way as to intercept the movement of actuating lever 36 and transmit the angular stroke of actuation (A) of actuating lever 36 to actuation unit 24 in order to actuate the latter.

Advantageously, adjustment lever 40 comprises adjustment means 44 for adjusting the rest position of adjustment lever 40 with regard to support structure 8, so actuating lever 36 is adjusted with regard to the handlebars 16. The adjustment means 44 are mechanically separate from actuating lever 36 and interact between adjustment lever 40 and actuating unit 24 in such a way as to adjust the said rest position.

Advantageously, actuating lever 36 comprises elastic preload means 48 designed to elastically influence actuating lever 36 in abutment against adjustment lever 40 in such a way as to follow the angular position of adjustment lever 40 in the first sense of rotation. In this way adjustment lever 40 defines the rest position of actuating lever 36.

In accordance with one form of implementation, actuating lever 36 comprises a thrust portion 52, facing adjustment lever 40 and designed to abut with a corresponding support portion 56 of adjustment lever 40.

Preferably thrust portion 52 and support portion 56 are counterprofiled in such a way as to create a coupling of form. in accordance with one form of implementation thrust portion 52 is a protuberance and support portion 56 is a concave surface designed to receive the said protuberance.

In accordance with one form of implementation actuating lever 36 is associated with adjustment lever 40 by means of pin 64.

In accordance with one form of implementation, the elastic preload means 48 comprises a helical spring 60 set coaxially with the said rotation pin 64 on which actuating lever 36 is mounted rotatably. For example, pin 64 is associated with the support structure by threaded means 66.

The said helical spring 60 acts between support structure 8 and actuating lever 36 in such a way as to elastically retain actuating lever 36 in rest position R. Preferably, helical spring 60 is set in an annular housing 68 in adjustment lever 40 around a hole 70 designed to house pin 64.

One extremity 72 of helical spring 60 lies against the wall of a niche 76 in support structure 8 of adjustment lever 40, and the other extremity 80 of helical spring 60 is inserted in housing 84 of actuating lever 36.

Helical spring 60 keeps actuating lever 36 constantly under elastic tension in the direction of the angular stroke of actuation (A) in such a way as to cause actuating lever 36 to abut with adjustment lever 40.

Advantageously, adjustment lever 40 is associated rotatably with support structure 8 in such a way as to be able to rotate in concord with both the angular stroke of actuation (A) and the angular stroke of collapse (C), setting out from the rest configuration.

In particular, with regard to the rest position, between adjustment lever 40 and support structure 8 there is angular play 86 in the direction of angular stroke of collapse C in such a way as to allow rotation of adjustment lever 40 in the same direction with regard to the angular rest position of adjustment lever 40 itself.

Rotation of the adjustment lever 40, in concord with the rotation of collapse with regard to the rest position, is limited by abutting end 88 on support structure 8.

Preferably the elastic preload means 48 are operationally connected, through actuating lever 36, also to adjustment lever 40 in such a way as to influence, in rotation towards the rest position, both actuating lever 36 and adjustment lever 40.

Preferably adjustment lever 40 is mounted rotatably on the said rotation pin 64 and coaxially to actuating lever 36.

In accordance with one form of implementation, actuating device 4 comprises a transmission portion 96, influenced by the said adjustment means 44 and associated in such a way as to transmit the movement of adjustment lever 40, thrust by actuating lever 36 along the angular actuation stroke (A), to actuation unit 24.

Transmission portion 96, thanks to the interposition of adjustment lever 40, is set with regard to actuating lever 36 in such a way that, when actuating lever 36 is in the angular stroke of collapse C, it is separate from transmission portion 96 in the sense that a force exerted on actuating lever 36 is not transmissible therefrom through direct contact to transmission portion 96. In other words, a force exerted on actuating lever 36 is transmitted directly and, preferably exclusively, to support structure 8, bypassing transmission portion 96.

In accordance with one form of implementation, transmission portion 96 is created as an elongated push rod with a transversal section that is preferably circular.

Transmission portion 96 comprises a working extremity 108, in contact with a piston 32 of actuation unit 24, and a connecting extremity 112 suitable for abutment with the said adjustment means 44 of adjustment lever 40.

Transmission portion 96 comprises, in an intermediate zone between the two extremities 108 and 112, of a connection portion 116 for connecting transmission portion 96 with hood 118 to protect actuation unit 24 from the external atmosphere.

Hood 118 may, for example, be bowl-shaped with a plain or accordion wall. Circumferential edge 120 of the open side of hood 118 is inserted in a special housing formed around an aperture 122 through which transmission portion 96 extends from the exterior to the piston housing 32.

Preferably connection portion 116 of transmission portion 96 is a circumferential groove formed by two parallel circumferential flanges 124 suitable for housing the preferably circular edge 126 of an aperture formed in closed wall 128 of hood 118, opposite the open side.

In accordance with one form of implementation, hood 118 is made from elastomer or elastic material.

In accordance with one form of implementation, adjustment means 44 comprises an adjustment screw 132 screwed into an appropriate threaded hole 136 in adjustment lever 40; preferably the adjustment screw 132 comprises an interface housing or seat 140 that interfaces with transmission portion 96.

For example, interface housing 140 is suitable for receiving connection extremity 112 of transmission portion 96 during the actuation stroke of actuating lever 36.

For example, interface housing 140 is funnel-shaped in such a way as to facilitate correct positioning and reciprocal engagement between interface housing 140 itself and connection extremity 112 of transmission portion 96 during the angular working stroke of actuating lever 36 and adjustment lever 40.

In accordance with one form of implementation, actuating device 4 comprises a second spring (not illustrated) which thrusts piston 32 of actuation unit 24 into an end of stroke rest position which corresponds to the rest position (R) of actuating lever 36, countering the thrust of the elastic preload means 48.

Preferably the second spring is calibrated in such a way as to prevail over the elastic preload of elastic preload means 48 to ensure that, with actuating lever 36 not activated, piston 32 remains in its end of stroke rest position and the actuating and adjustment levers 36 and 40 in their respective rest positions R.

There now follows a description of the functioning of the lever device as per this invention.

Figure 4:
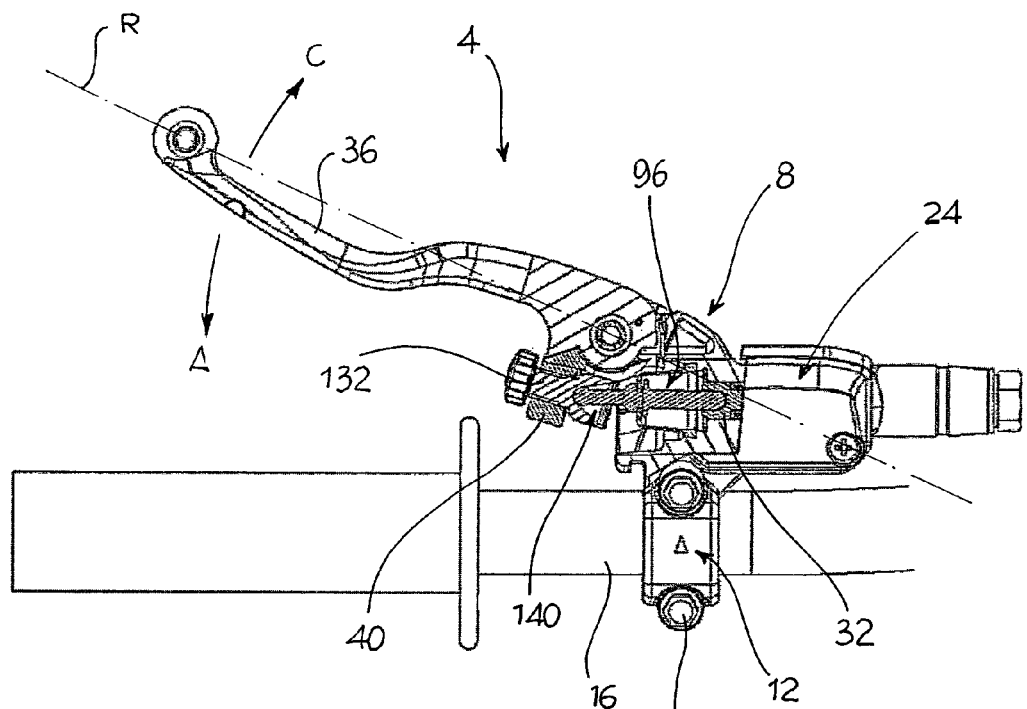

In the rest condition of actuating device 4, and therefore in the absence of its actuation, helical spring 60 elastically thrusts actuating lever 36 against adjustment lever 40 and in turn brings adjustment lever 40 into contact with transmission portion 96; the funnel shape of the interface housing 140 of adjustment lever 40 ensures perfect reciprocal positioning of the lever itself with regard to transmission portion 96 (FIG. 4).

Figure 5:
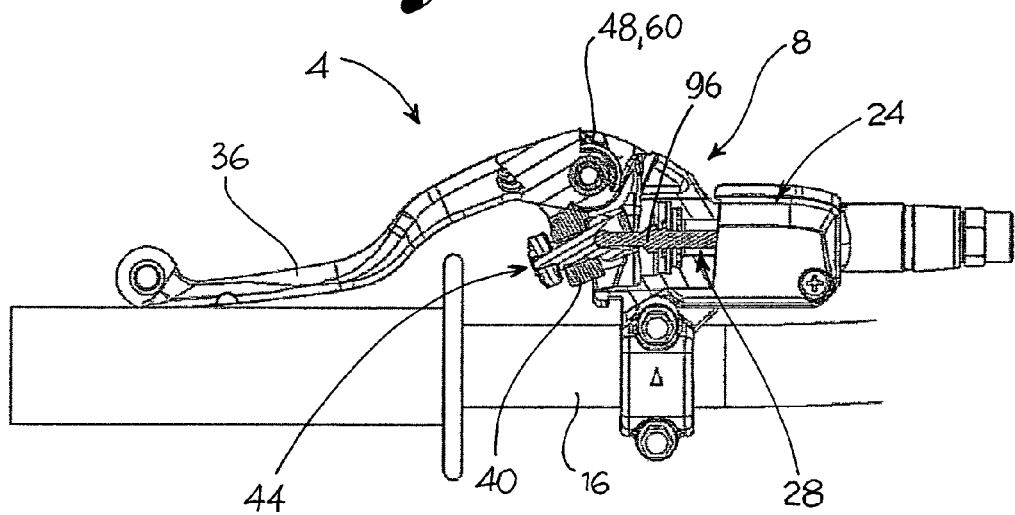
FIGS. 5-6 show views of the device in FIG. 1 under different operational conditions.

During normal functioning of actuating device 4, with actuation of actuating lever 36, the latter moves in actuation direction A, thus also moving adjustment lever 40 and the related transmission portion 96 which transmits movement to piston 32. Piston 32 is then shifted from its end of stroke rest position to a working position in order to activate the connected clutch or brake (FIG. 5).

In the case of an accident or a simple falling of the motorcycle that causes movement of actuating lever 36 in the direction opposite to the one for applying brake or clutch, actuating lever 36 enters its angular stroke of collapse C and at the same time separates thrust portion 52 from support portion 56 of adjustment lever 40.

Transmission portion 96 is elastically maintained in position since adjustment lever 40 is limited in its stroke together with the collapse stroke of actuating lever 36. In other words, interface housing 140 does not move far enough to allow emergence of push rod 96; in yet other words, angular play 86 does not allow the emergence of transmission portion 96.

Movements and impacts, in particular those transversal to the plane in which actuating lever 36 can rotate, are transmitted by actuating lever 36 only to support structure 8, without affecting either adjustment lever 40 or transmission portion 96, which therefore remains down.

Figure 6:
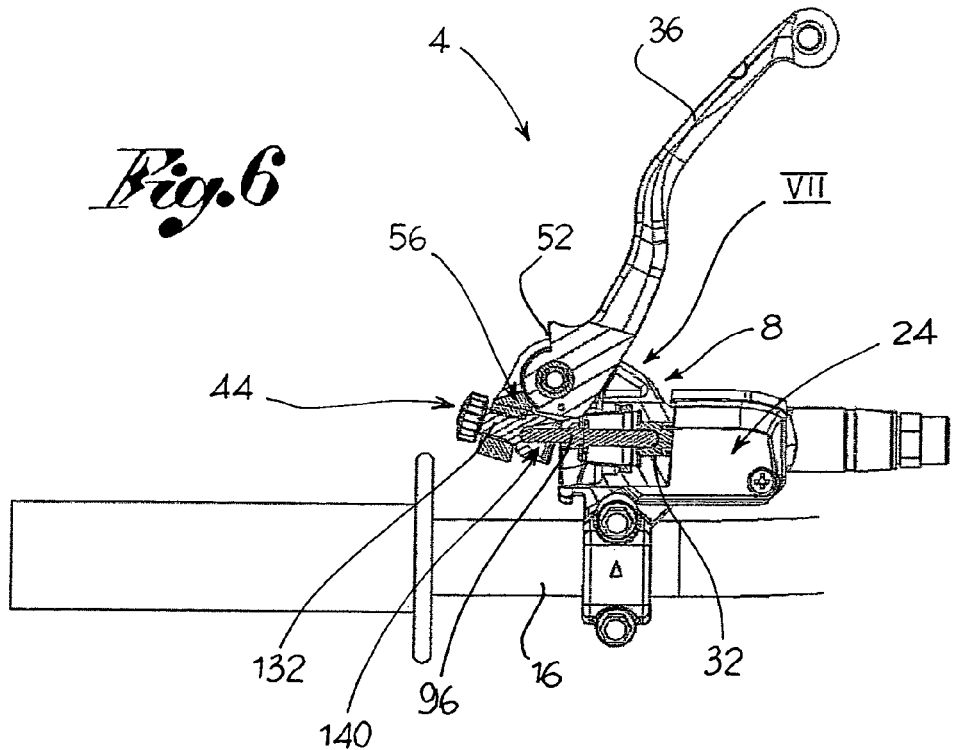
Figure 7:
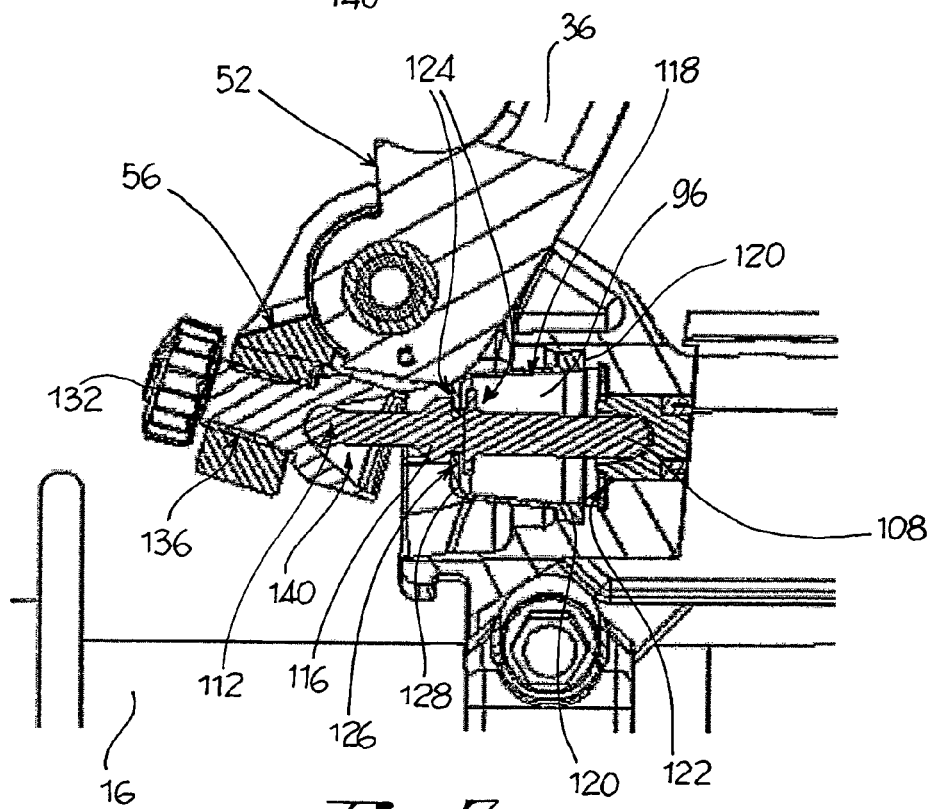
FIG. 7 shows the enlarged detail VII of FIG. 6.

Following collapse, actuating lever 36 turns until it reaches, where necessary, the maximum angular distance from handlebars 16 (FIG. 6).

Adjustment lever 40, not being influenced by actuating lever 36, can rotate freely also in accordance with the angular stroke of collapse. This rotation, substantially equal to the angular play identified with the support structure, is however limited by the abutment in such a way that the organ of transmission can never exit its housing.

After a fall, when the bike's handlebars (16) are raised from the ground, helical spring 60 brings actuating lever 36 and adjustment lever 40 back to rest position R, and interface housing 140 of adjustment lever 40 engages connection extremity 112 of transmission portion 96.

As may be appreciated from the foregoing, the device described in this invention overcomes the drawbacks in state of the art technique.

Advantageously, the actuating lever is mechanically distinct from the adjustment lever, so in the case of breakage or damage only the actuating lever need be replaced.

The actuating lever has a simple geometry without elements that might trigger cracks as a result of fall or impact. This considerably reduces the risk of breaking the actuating lever itself in an undesired position.

Moreover, the actuating lever also has a reduced bulk since it does not comprise an adjustment device.

Advantageously, any impacts undergone by the actuating lever are transmitted neither to the adjustment lever nor therefore to the transmission portion and actuation unit.

In other words, the transmission portion is set on the adjustment lever, mechanically separate from the actuating lever, in such a way that when the actuating lever is in the angular stroke of collapse (C), it is separate from the transmission portion and does not transmit any force thereto.

In yet other words, when the actuating lever is in the angular stroke of collapse (C), it is mechanically separate from the adjustment portion and the transmission portion in such a way that a force exerted on the lever is transmitted to the support structure, bypassing the transmission portion.

So even in the case of actuating lever breakage, no other component need be replaced.

Furthermore, in the case of damage or partial cracking of the actuating lever, as long as it can still rotate and thrust the adjustment lever it will efficiently activate the actuating unit.

In the case of damage, only the actuating lever need be replaced and not, as with state of the art devices, the whole lever device or at least the entire actuating lever complete with adjustment.

To meet contingent and specific needs a sector technician could, with regard to the devices described above, carry out numerous modifications and variants yet without going beyond the context of the invention as defined in the following claims.

The invention claimed is:

1. An actuating device with lever for vehicles having handlebars, the actuating device comprising:
   a support structure with a bracket connecting the device to the handlebars,
   an actuation unit being fixedly connected to the support structure, and the actuation unit having a piston being movable along an axis extending parallel to the handlebars,
   an actuating lever having a contact surface and being pivotably connected to the support structure by an adjustment lever in such a way as to rotate along an angular stroke of actuation which extends from an angular rest position of said actuating lever, in a first direction of rotation towards the handlebars, and along an angular stroke of collapse which extends from the said angular rest position of the actuating lever in a second direction of rotation, opposite to the first direction of rotation,
   the adjustment lever having a contact surface and being mechanically distinct from the actuating lever, and the contact surface of the actuating lever directly abutting the contact surface of the adjustment lever such that movement of the actuating lever along the angular stroke of actuation is transmitted directly to the adjustment lever which transmits the movement, via an adjustment screw, to the piston of the actuation unit in order to activate the actuation unit,
   the adjustment screw being supported within a through bore in the adjustment lever such that the adjustment screw extends beyond opposite side surfaces of the adjustment lever, and one end of the adjustment screw having a housing which captively engages with and directly drives a transmission portion that abuts the piston,
   the adjustment screw facilitates adjustment of an angular rest position of the adjustment lever with respect to the support structure,
   said adjustment screw being mechanically separate from the actuating lever, and mechanically engaging the actuation unit, and
   the actuating lever comprises elastic preload means for biasing the contact surface of the actuating lever into abutment against the contact surface of the adjustment lever.

2. The actuating device in accordance with claim 1, in which the contact surface of the actuating lever abuts the contact surface of the adjustment lever, and the housing at the one end of the adjustment screw extends from one of the side surfaces of the adjustment lever, and an opposite end of the adjustment screw extends from a further one of the side surfaces of the adjustment lever to facilitate rotating the adjustment screw.

3. The actuating device in accordance with claim 2, in which the contact surface of the actuating lever and the contact surface of the adjustment lever are reciprocally shaped.

4. The actuating device in accordance with claim 2, in which the contact surface of the actuating lever comprises a protuberance and the contact surface of the adjustment lever comprises a concave surface which receives said protuberance.

5. The actuating device in accordance with claim 1, further comprising a pin seated in said support structure, wherein said actuating lever is rotatably mounted on said pin, and said elastic preload means comprises a helical spring mounted on said pin.

6. The actuating device in accordance with claim 1, in which the adjustment lever is rotatably mounted on the support structure such that the adjustment lever is rotatable in unison with the actuating lever when the actuating lever rotates from the angular rest position along both the angular stroke of actuation and the angular stroke of collapse.

7. The actuating device in accordance with claim 6 in which, the adjustment lever is mounted on the support structure such that there is angular play between the adjustment lever and the support structure in the second direction of rotation to allow rotation of the adjustment lever toward the angular rest position of the adjustment lever.

8. The actuating device in accordance with claim 6 in which the support structure has an abutting end which abuts the adjustment lever to limit rotation of the adjustment lever from the angular rest position along the angular stroke of collapse.

9. The actuating device in accordance with claim 1, in which the elastic preload means are operationally connected, through said actuating lever, also to the adjustment lever in such a way as to influence, in rotation towards the rest position, both the actuating lever and the adjustment lever.

10. The actuating device in accordance with claim 1 further comprising the transmission portion is a push rod which transmits movement of the adjustment lever, thrust by the actuating lever along the angular actuation stroke, to the actuation unit, and the adjustment screw extends completely through the adjustment lever to facilitate rotating the adjustment screw from an end of the adjustment screw opposite from the housing.

11. The actuating device in accordance with claim 10, in which the push rod comprises a working extremity in permanent contact with the piston of the actuation unit and a connecting extremity in contact with the said housing of the adjustment screw.

12. The actuating device in accordance with claim 11, in which the housing of said adjustment screw comprises a seat for receiving said connecting extremity of the push rod.

13. The actuating device in accordance with claim 12, in which the seat is funnel shaped.

14. An actuating device with an actuating lever for vehicles having handlebars, the actuating device comprising:
  a support structure coupled, via a connector, to the handlebars;
  an actuation unit is connected to the support structure and comprises an elongate transmission member, the elongate transmission member defines a first axis extending parallel to the handlebars, the elongate transmission member has first and second axial ends, and is axially movable to actuate the actuation unit;
  an actuating lever is pivotably connected to the support structure such that, with respect to the support structure, the actuating lever is pivotable in a first rotational direction along an angular actuation stroke from an angular rest position of the actuating lever toward the handlebars, and is pivotable along an angular collapse stroke which extends from the angular rest position of the actuating lever in a second rotational direction opposite to the first rotational direction;
  an adjustment lever is mechanically distinct from the actuating lever and rotatably connected to the support structure, the adjustment lever has a contact surface which directly abuts a contact surface of the actuating lever such that pivotable movement of the actuating lever along the angular actuation stroke is transmitted from the actuating lever directly to the adjustment lever and pivotable movement of the adjustment lever is transmitted to the actuation unit to activate the actuation unit;
  the adjustment lever comprises an adjustment member for adjusting a rest position of the adjustment lever with respect to the support structure, the rest position of the adjustment lever defines the rest position of the actuating lever, the adjustment member defines a second axis and is mechanically separate from the actuating lever, the adjustment member is rotatably supported in a threaded through hole that extends from a first surface to a second surface of the adjustment lever, the adjustment member has a housing end with a cavity which directly engages the first axial end of the elongate transmission member of the actuation unit such that pivotable movement of the adjustment lever alters an angular orientation between the second axis of the adjustment member and the first axis of the elongate transmission member;
  the actuating lever comprises an elastic preload member which biases the contact surface of the actuating lever into abutment against the contact surface of the adjustment lever such that pivotable movement of the actuating lever along the angular collapse stroke correlates to pivotable movement of the adjustment lever along the angular collapse stroke; and
  the support structure has an abutment which limits the pivotable movement of the adjustment lever along the angular collapse stroke from the rest position of the adjustment lever at a pivotable movement limit, and the abutment of the support structure permits continued pivotable movement of the actuating lever along the angular collapse stroke beyond the pivotable movement limit of the adjustment lever along the angular collapse stroke.

* * * * *